April 9, 1968  R. J. McNATT ET AL  3,377,036
TENSIONING APPARATUS
Filed April 15, 1966
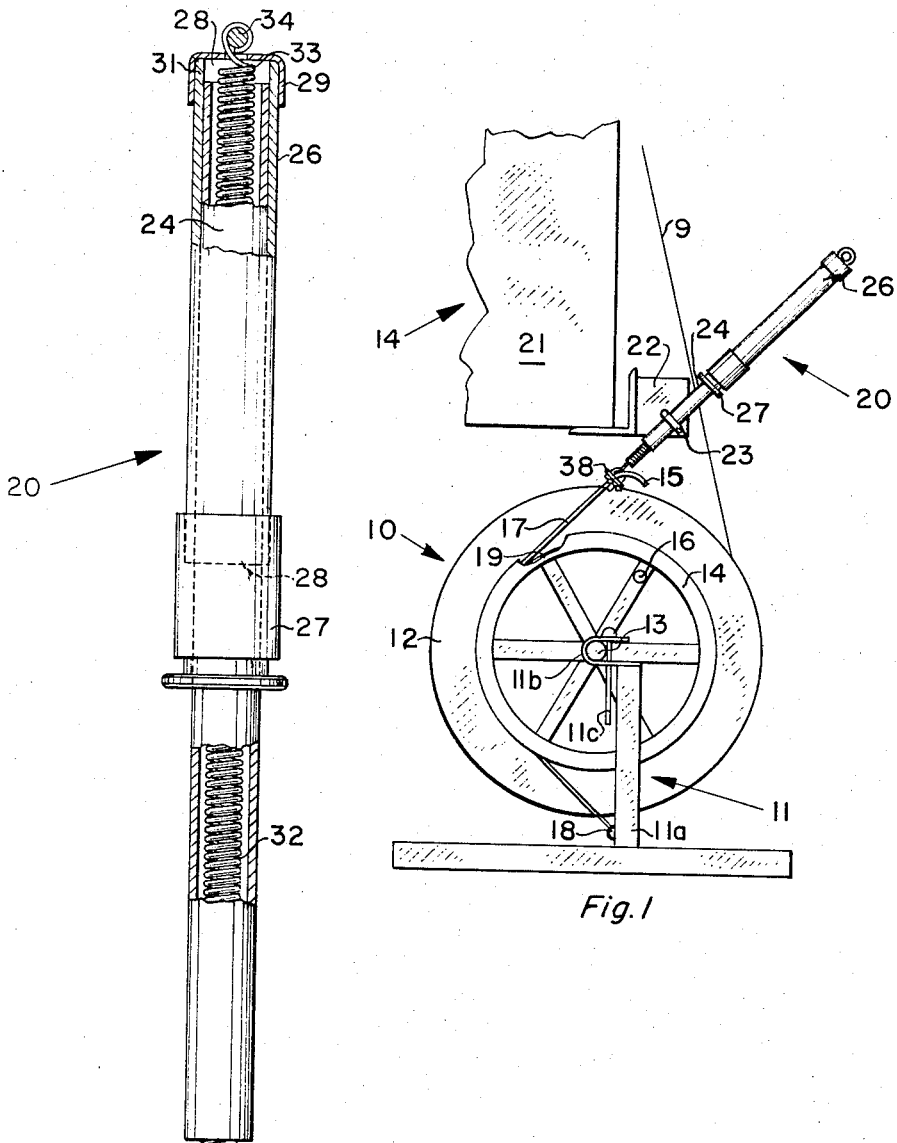
Fig. 1
Fig. 2
INVENTORS
R. J. McNATT
L. C. SMITH
BY
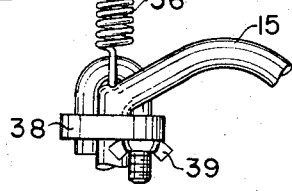
THEIR AGENT

United States Patent Office 3,377,036
Patented Apr. 9, 1968

3,377,036
TENSIONING APPARATUS
Ronald J. McNatt and Lambert C. Smith, Anderson, Ind., assignors to Anaconda Wire and Cable Company, a corporation of Delaware
Filed Apr. 15, 1966, Ser. No. 542,898
4 Claims. (Cl. 242—156.2)

ABSTRACT OF THE DISCLOSURE

A sensitive tensioning device for reel pay-offs comprises a long spring incased in a pair of telescoping tubes. The inner tube is rigidly mounted and the spring is fastened to the remote end of the outer tube which can be locked in various degrees of extension.

Our invention relates to tensioning apparatus and particularly to such apparatus for braking a wire reel.

In paying off wires and other strands from a rotating reel it is customary to brake the pay-off reel by means of a braking strap, which may be no more than a length of clothesline, fixed at one end and hung over a sheave with a weight on the other end. The sheave rotates on the reel shaft and has a pin that engages a dog hole in the reel so that the sheave and the reel must rotate together. In this known apparatus the tension in the wire being paid from the reel can be varied by changing the weight hung on the braking strap. To make fine adjustments in the tension it would be necessary to keep a large number of different weights at each pay-off reel and this is not practical in a busy factory such as a factory for enamelling magnet wire where hundreds of pay-off reels are being operated simultaneously.

We have invented an apparatus that is instantly adjustable to apply tension over a wide range of values. Our apparatus is infinitely adjustable within this wide range.

Our apparatus is inexpensive and can be readily built in a factory machine shop.

Our apparatus, furthermore, is rugged and readily adapted to existing equipment.

In addition, our apparatus protects the tensile member from dirt and accidental abrasion.

Our tensioning apparatus comprises an inner tubular member, a shorter outer tubular member slidable over the inner with one end of the inner member projecting from the outer member, and means for locking the relative positions of the two members. There are means fixedly securing the projecting end of the inner member rotative to an external object and there is a stretchable tensile member, such as a helical spring, within the inner tubular member with one end of the tensile member secured to the outer tubular member and the other end of the tensile member connected to exert tension on the above-mentioned object through the projecting end of the inner member.

We have invented a wire pay-off apparatus comprising a reel of wire being paid off, a support rotatably mounting the reel and braking means for the reel. The braking means may comprise a sheave mounted coaxially to the reel, means engaging the sheave to the reel, a brake strap circumferentially engaging the sheave, and means for fixing one end of the brake strap to the support. Our apparatus further comprises a first elongated rigid member fixed relative to the support and second elongated rigid member, slidably supported on the first member, with means for locking the relative positions of the two elongated members. An elongated stretchable tensile member is fastened at one end to the second member and at the other end to the braking means.

A more thorough understanding of our invention may be gained from an examination of the appended drawing. In the drawing:

FIGURE 1 shows a side view of a reel mounted in accordance with our invention.

FIGURE 2 shows an enlarged view of an element of FIGURE 1.

The pay-off apparatus indicated generally by the numeral 10 has a reel support 11 mounting a wire reel 12 paying off a wire strand 9 into an enamelling machine 14. The support 11 comprises a pair of uprights 11a, of which only one is visible in the drawing, a pair of bent plates 11b mounted at the top of the uprights 11a and pins 11c fitting through holes in the bent plates in a known manner to lock a reel shaft in place, as shown. We have shown an enamelling machine because our apparatus has particular application for pay-offs into such machines where the wire is advanced in long catenaries in the ovens and an imbalance in the reel might allow the wire to run ahead and sag unduly. The reel 12 rotates on a shaft 13 on which there is also rotatably mounted a sheave 14. The sheave 14 and reel 12 are caused to rotate in unison by means of a pin 16 that fits into a dog hole in the reel in the usual manner. Braking of the sheave-reel assembly is accomplished by means of a brake-strap 17, one end 18 of which is fixed to the base of the support 11. The strap 17 achieves its braking action by friction within the groove 19 of the sheave 14 so that the strap 17 is subject to considerable wear and must be replaced at intervals.

Tension is applied to an end 15 of the strap 17 by means of our tensioning apparatus indicated generally by the numeral 20. The apparatus 20 is fixedly mounted to the frame 21 of the oven 14 by means of a bracket 22 and clamp 23 attached to an inner tubular member, or cylinder 24 of the apparatus 20. Since the pay-off 10 in the illustrated embodiment is close to the oven 14, the latter provides a convenient fixed mounting for the tensioning device 20 but it will be understood that the bracket 22 might be mounted directly to a frame corresponding to the support 11 or any other object having a fixed relation to the reel mounting. Concentric to the cylinder 24 and slidably mounted thereon, is an outer tubular member or cylinder 26 which can be locked to the cylinder 24 by means of a lock collar 27. A suitable lock collar is sold under the name Quick-Lock by Wire Accessories, Inc. of Bridgeport, Conn., and other locking collars are known. A set screw collar attached to the tubular member 26 would also serve, within the scope of our invention, to lock the two cylinders 24 and 26 together, but preassembled, commercially available locking collars are more convenient to use. The tubular member 26 has an open end 28 and is closed by a cap 29 on its other end 31. An elongated tension spring 32 has one end 33 attached to the end 31 of the cylinder 26 by means of a pin 34 holding it to the cap 29. The spring 32 is long enough to extend entirely through the inner tubular member 24 so that it can be attached on its other end 36 to the free end 15 of the strap 17. A U-bolt 38 closed by a wing nut 39 provides a preferred method of attaching the spring 32 to the strap 17 since the length of the strap can be quickly adjusted. Although we have shown the spring 32 attached directly to the strap 17 it will be understood that a short tie line might be connected between the spring and the strap, in which case the spring need not actually project from the end of the cylinder 24.

In the operation of our apparatus the reel 12 is originally set to pay-off the wire 9 under very light tension. This has the advantage that there is a minimum danger of stretching the wire and it is achieved by having the cylinder 26 moved down upon the cylinder 24. If, in the course of operation it is discovered that greater tension should be applied, the lock collar 27 is loosened, the cylinder 26 is pushed up on the cylinder 24 and the lock collar tightened again. Since, in our apparatus, the spring 32 can be very long a wide range of tension is possible and these are infinitely adjustable within very fine limits. Furthermore, it will be observed that the spring 32 is almost entirely enclosed within the member 24, and 26 and can, as has been explained, be entirely enclosed if desired. Thus the spring is protected from mechanical damage and from dust. It is also possible, within the scope of our invention to curve the bottom of the tube 24 so that the remainder of the apparatus including the tube 26 is vertical. By this means a more compact arrangement of our apparatus is possible.

Although we prefer to use a helical spring for the tensile member 32 other elongated stretchable elastic members such as rubber or neoprene ropes might be used within the scope of our invention.

We have invented a new and useful apparatus for which we desire an award of Letters Patent.

We claim:
1. A tensioning apparatus comprising:
 (A) an inner tubular member,
 (B) an outer tubular member, slidable over said inner member,
  (a) said outer member being shorter than said inner member,
  (b) one end of said inner member projecting from said outer member,
 (C) means for locking the relative position of said inner and outer members,
 (D) means fixedly securing said projecting end of said inner member relative to an object external of said apparatus,
 (E) a stretchable tensile member within said inner member,
  (a) one end of said tensile member being secured to said outer member,
  (b) the other end of said tensile member being connected to exert tension on said object through the projecting end of said inner member.
2. The apparatus of claim 1 wherein said tensile member comprises a helical spring.
3. A wire pay-off apparatus comprising
 (A) a reel of wire being paid of,
 (B) a support rotatably mounting said reel,
 (C) braking means for said reel,
 (D) a first elongated rigid member fixed relative to said support,
 (E) a second parallel elongated rigid member, supported to slide lengthwise on said first member, said second member having a first extremity toward said reel and a second extremity remote therefrom,
 (F) means for locking the relative positions of said first and second members,
 (G) an elongated stretchable tensile member fastened at one end to said remote extremity of said second member and at the other end to said braking means, each of said rigid members at least partially enclosing and protecting said stretchable member.
4. A wire pay-off apparatus comprising
 (A) a reel of wire being paid off,
 (B) a support rotatably mounting said reel,
 (C) a brake sheave mounted coaxially to said reel,
 (D) means engaging said sheave to said reel,
 (E) a first elongated rigid member fixed relative to said support,
 (F) a second parallel elongated rigid member, supported to slide lengthwise on said first member,
 (G) means for locking the relative position of said first and second members,
 (H) a brake strap circumferentially engaging said sheave,
 (I) means fixing one end of said brake strap to said support,
 (J) an elongated stretchable tensile member fastened at one end to said second member, and at the other end to the free end of said strap, each of said rigid members at least partially enclosing and protecting said stretchable member.

References Cited

UNITED STATES PATENTS

| | | | |
|---|---|---|---|
| 520,874 | 6/1894 | Black | 242—75.41 |
| 1,031,487 | 7/1912 | Taylor | 242—156.2 |
| 1,924,585 | 8/1933 | Wood | 242—75.41 X |
| 2,920,840 | 1/1960 | Cooper | 242—156.2 |
| 3,081,957 | 3/1963 | Van De Bilt | 242—156.2 X |

FOREIGN PATENTS

| | | |
|---|---|---|
| 308,090 | 3/1929 | Great Britain. |
| 311,857 | 5/1929 | Great Britain. |

STANLEY N. GILREATH, *Primary Examiner.*